United States Patent [19]

Yamazaki

[11] Patent Number: 4,954,985
[45] Date of Patent: Sep. 4, 1990

[54] FERROELECTRIC LIQUID CRYSTAL DATA STORAGE CARD

[75] Inventor: Shunpei Yamazaki, Tokyo, Japan

[73] Assignee: Semiconductor Energy Laboratory Co., Ltd., Atsugi, Japan

[21] Appl. No.: 192,016

[22] Filed: May 9, 1988

[30] Foreign Application Priority Data

May 9, 1987 [JP] Japan .................................. 62-113248
May 9, 1987 [JP] Japan .................................. 62-113249
May 13, 1987 [JP] Japan .................................. 62-117281

[51] Int. Cl.$^5$ ............................................. G11C 13/04
[52] U.S. Cl. .................................. 365/108; 365/117; 235/380; 235/492
[58] Field of Search .............. 365/108, 109, 117, 145, 365/180; 235/380, 487, 492

[56] References Cited

U.S. PATENT DOCUMENTS

| | | | |
|---|---|---|---|
| 3,967,253 | 6/1976 | Tsuruishi | 365/117 |
| 4,040,720 | 8/1977 | York | 365/117 X |
| 4,051,465 | 9/1977 | Brody | 365/117 |
| 4,158,201 | 6/1979 | Smith et al. | 365/109 X |
| 4,575,621 | 3/1986 | Dreifus | 235/380 |
| 4,614,861 | 9/1986 | Pavlov et al. | 235/380 |
| 4,752,820 | 6/1988 | Kuroiwa et al. | 365/108 |
| 4,758,718 | 7/1988 | Fujisaki et al. | 235/487 |
| 4,812,634 | 3/1989 | Ohta | 235/492 |

*Primary Examiner*—James W. Moffit
*Attorney, Agent, or Firm*—Sixbey, Friedman, Leedom & Ferguson

[57] ABSTRACT

A card with a display function and a data storage capability comprises a pair of substrates; a plurality of electrodes on the substrates; a liquid crystal orientation control film on the electrodes; and a liquid crystal material with a strong dielectric property filled between the pair of substrates; wherein the liquid crystal material with the strong dielectric property is utilized to provide for a liquid crystal display region and a data storage region to write in, erase, and rewrite external data by addition of external energy to the liquid crystal material.

20 Claims, 3 Drawing Sheets

FERROELECTRIC LIQUID CRYSTAL DATA STORAGE CARD

FIELD OF THE INVENTION

The present invention relates to a card which has data storage capability in the card itself and can be used as a bank CD (cash dispenser) card, for example as an ID card for maintaining secrecy, and as a card for presale of train passenger tickets and the like.

BACKGROUND OF THE INVENTION

Conventionally, the type of cards used as bank CD cards, cards for presale of train passenger tickets, and the like, are constructed by the application of magnetic tape to a paper or plastic plate. This magnetic tape section has the capability of storing account numbers, cash balances, and the like. However, the storage volume of the magnetic tape is extremely small and there is just enough room to store a few columns of numbers and symbols.

In addition, the details stored on this tape cannot be rewritten at will.

It is the so-called IC card that is a card having an integrated circuit to store electrically rewritable ROM (EEPROM) so as to overcome the problems as mentioned above.

Specifically, the IC card was developed with the object of increasing the storage volume, and consideration was given to the use of an integrated circuit providing a large memory volume to make rewrite possible. However, use of terminal equipment connected to a host computer is required not only for the total memory possible within such a card but also for even the smallest amount of data which the cardholder wishes to know, and the data must first be displayed on the display device of the terminal equipment to read the details.

For this reason, there has been a demand for a card which has the capability of displaying the stored data content so that it can be made to appear on the card itself.

For this reason, it is necessary that the part which performs the display and the part that stores the data be formed on the same card.

A liquid crystal display is most generally used as the part for performing the display because of its display capabilities and low electric power consumption and the like.

On the other hand, an EEPROM (Electrically Erasable Programmable ROM) is generally used as the part which stores the data, because of its large storage content and the like.

However, forming them on the same card would increase the number of processes to cause the card structure to become complicated, and many other technical problems would be produced.

The inventor of the present invention has invented "an optical disk device using ferroelectric liquid crystals" for which application has been made for a patent (Japanese Patent Application Sho-60-130190). This is a storage (memory) using ferroelectric liquid crystals. The reading, rewriting, and erasure of the stored data is handled in the same way.

When an optical disk memory using the ferroelectric liquid crystals is applied in practice, there are a number of problems which must be overcome.

Examples of such problems are as follows.

(1) Between the disks, the molecules must be correctly lined up and a monodomain formed in a region corresponding to at least one bit.

(2) A storage region must be established on the disk. Specifically, adjacent individual storage regions must be properly isolated, and any case of erroneous access must be detected.

SUMMARY OF THE INVENTION

An object of the present invention is to provide, with due consideration to the drawbacks of such conventional devices, an erasable non-volatile card (IC card).

It is another object of the present invention to provide an IC card in which the display region and the memory region are formed from the same liquid crystals with strong dielectric characteristics with the number of processes curtailed.

It is another object of the present invention to provide an IC card whereby the above two points have been improved and the structure has been simplified.

It is another object of the present invention to provide an IC card wherein provision for the tracking of the card's storage region and elimination of orientation defects in the liquid crystals can be easily handled.

According to one aspect of the invention, this is accomplished in the present invention by the provision of a card with a display function and a data storage capability comprising a pair of substrates; a plurality of electrodes on the substrates; a liquid crystal orientation section on the electrodes; and a liquid crystal material with a strong dielectric property filled between the pair of substrates; wherein the liquid crystal material with the strong dielectric property is utilized to provide for a liquid crystal display region to assume one of a matrix structure and a shape including diagrams, characters and symbols to display a shape including diagrams, characters and symbols, and a data storage region to write in, erase, and rewrite external data as a signal by addition of external energy including electrical, heat and light energies to the liquid crystal material.

Provided in one feature of the card of the present invention is a protruding section by which a storage region within the pair of substrates is partitioned at bit pitch intervals.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1A:
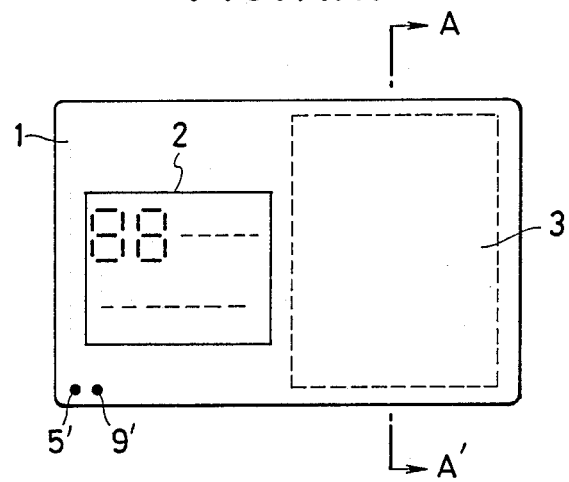
FIG. 1(A) shows a plan view of a card according to the present invention.
Figure 1B:
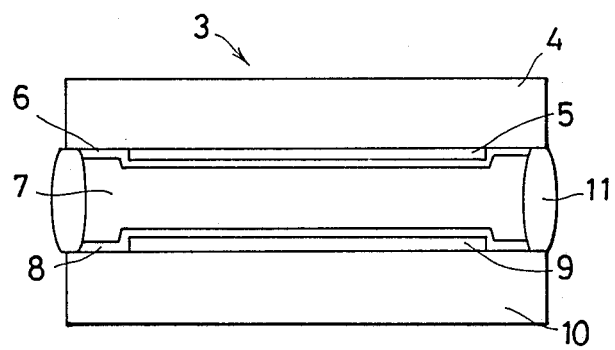
FIG. 1(B) shows a sectional diagram of the card according to the present invention.
Figure 3:
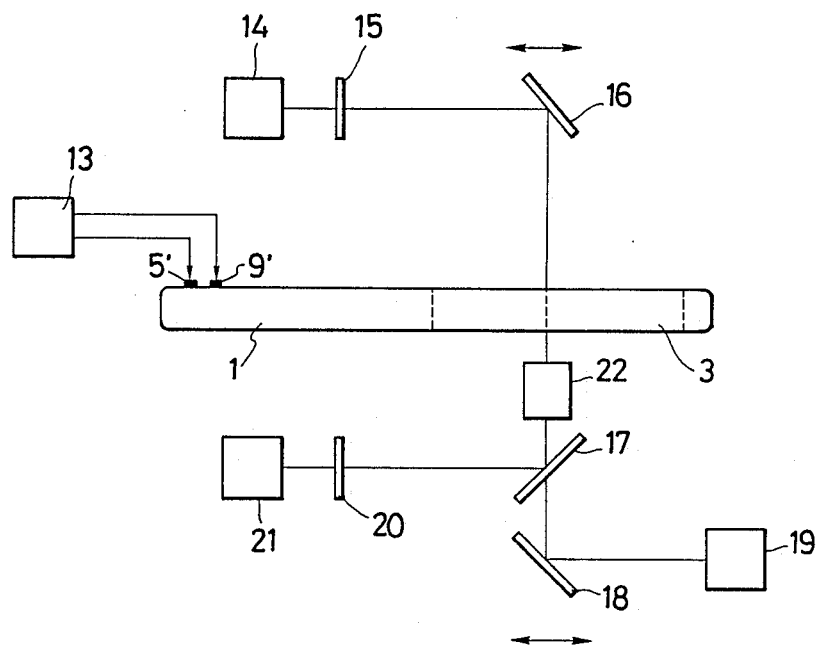
FIG. 3 is a diagram showing a card system of the present invention.

Now referring to FIG. 1(A), a card is shown which has a display function and a data storage capability. FIG. 1(B) is a sectional drawing viewing in the direction A—A'. FIG. 3 shows a system used by the card of the present invention.

Figure 2:
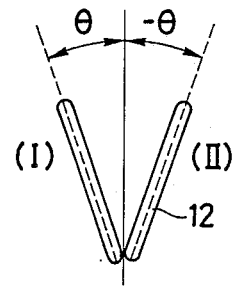
FIG. 2 is a diagram of the states assumed by the liquid crystal element.

In the storage method of the card with display function and data storage capability, as shown in FIG. 2, a liquid crystal molecule 12 with an angle $\theta$ of its director is in a first inclined state with respect to the layer normal, and when external electric, thermal, or light energy is imparted to the molecule 12, it is changed to a second state at an angle $-\theta$ with respect to the layer normal.

At this time, the difference in the two states is determined from an optically developed change detected according to the difference between the first and second states, using an external detection means.

Specifically, the data is recorded in memory as a signal with the first state represented as 0 and the second state as 1.

The method by which the liquid crystal molecule is made to assume the first and second states is now explained by means of the sectional diagram of the memory region part of this card, shown in FIG. 1(B).

It is made sure by the following method that the directions of the molecules are directed in the same direction throughout the thickness of the liquid crystal layer between a pair of substrates. In the method, which is generally referred to as SSFLC, the states are obtained by providing a sufficiently short space between the pair of top and bottom substrates 4 and 10 than a spiral pitch of the ferroelectric liquid crystals 7. In this method, by means of an imposed force from the contact surface of the substrate, the liquid crystal molecule assumes the two states.

The stability of the states are expedited by utilizing the difference in polarity produced when providing a ferroelectric film used for a pair of top and bottom liquid crystal orientation films 6 and 8, so that the liquid crystal molecules are directed.

In addition, there is another expediting method in which the liquid crystal orientation films 6 and 8 are laminated from a dielectric film and a metallic film, and an electric field generated by storing an electrical load in the metallic film, is applied to a liquid crystal layer 7 so as to produce the first and second states.

The present invention will now be further explained by means of the following embodiment.

A memory card has a pair of opposing substrates 4 and 10, which is 8.6 cm wide and 5.4 cm long. Also, on the inside of the pair of substrates 4 and 10, there is a pair of transparent electrodes 5 and 9. On this pair of electrodes 5 and 9, a pair of orientation control films 6 and 8 is respectively formed. Between the substrates 4 and 10, an FLC 7 is filled.

Figure 1C:
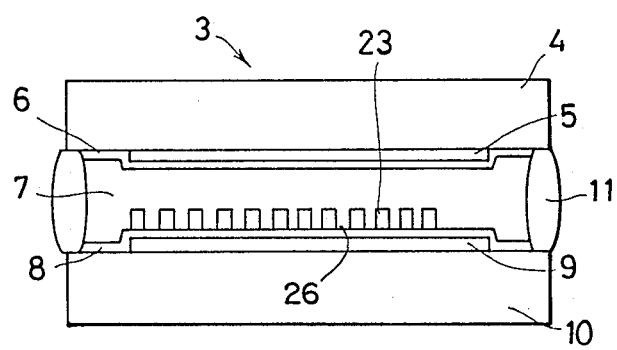
FIG. 1(C) shows a modification of the structure illustrated in FIG. 1(B).

In addition, at least one protruding section 23, by which the storage region is partitioned at bit pitch intervals, may be provided for position marker on the liquid crystal orientation control film 8, if necessary, as illustrated in FIG. 1(C).

On the drawing, the interval is shown as being very wide, being enlarged for convenience. Actually, when utilized, one protruding section 23 is provided every few micrometers and the storage region on the card is partitioned in one direction, parallel to the periphery of the card.

Specifically, a plurality of protruding sections 23 with a height of 1.5 $\mu$m, width of 3 $\mu$m, at intervals of 5 $\mu$m are formed on the orientation control film 8 from a photosensitive polyimid resin. At this time, after the photosensitive polyimid resin is applied to the front surface, the specified pattern is formed by means of a photomask.

Also, the FLC 7 is filled into the space between the substrates.

A sealant 11 is applied around the periphery of the memory card to prevent the FLC 7 from contacting the air. A pair of external contact electrodes 5' and 9' are provided on the outside periphery of the memory card, extending from the pair of electrodes 5 and 9. The external contact electrodes 5' and 9' are connected with a lead terminal led out from a signal source 13, and perform erasure by the application of a prescribed voltage when erasing the writing (full surface erasure method) in the memory.

In this way, all zeroes are written in as data for the entire memory region. Specifically, light is emitted from a light beam, particularly infrared rays 19, via a mirror 18 and a half-mirror 17, and via a system 22 for optical focussing and position compensation and the like, onto a specified address in the liquid crystal layer out of domains which are arranged in matrix form across the whole surface, and the state of the liquid crystal molecules at the specified address are shifted from the initial state thereby performing a write-in. At this time, quick, accurate data write-in is possible by the application of a lower voltage than a threshold direct voltage to reverse the liquid crystals between the top and bottom electrodes 5 and 9. The light reaches a photosensor 14 via a mirror 16 and the write-in of the data is monitored.

To read out the data, a laser beam radiated from a semiconductor laser 21 is directed onto the memory card via a polarizer 20 and the half-mirror 17, and via an optical system 22 for focussing position compensation or auto tracking. The light transmitted onto the storage region 3 of the memory card reaches a light receiving sensor 14 via the polarizer 15 and the mirror 16. In the light sensor 14 the transmission or non-transmission of the laser beam is detected to read the data.

In this case, when the data is being written in and read out, the mirrors 16, 17 and 18 and the optical system 22 are moved relatively parallel to the card 1 and the data is written into, or read out of, the specified address.

In other words, the card 1 may be moved, or the mirror and optical system moved automatically, or both may be moved simultaneously.

When this data is written in or read out using the protruding section 23, the volume of the liquid crystal 7 on the protruding section 23 is smaller or completely non-existent in comparison with the data storage section 26, so that in the case where the write-in and read-out beams are offset from the data storage section 26, an optical change is not obtained based on the optical anisotropy of the liquid crystal material when the beam reaches the photocell 14. Accordingly, the beam only occurs in a transparent or opaque state (according to the arrangement of the light polarizing means 15 and 20). This is detected electrically, and the position of the mirror and optical system is revised. It is then possible to direct the write-in and read-out beams correctly onto the data storage section 26.

In addition, even if the protruding section is formed from a reflecting material, the position modification can be performed in the same way.

In the storage region 3 of the present invention, the substrates 4 and 10 are formed from plastic or Corning 7059 glass. On these substrates, a transparent conductive film ITO (indium tin oxide) is formed by the vacuum deposition method. Then, on the inside of the pair of substrates 5 and 9, the assymmetric oriented films 6 and 8 are provided, and a liquid crystal cell is formed to have a substrate thickness of 2 μm. The liquid crystal layer 7 is interposed between the substrates. In order that orientation is carried out, on the electrode 5, PAN (polyacryl nitryl) and PVA (polyvinyl alcohol) are provided by a spinning method to a thickness of 0.1 μm, and subjected to a common rubbing process. The orientation control film may be formed of SiO2 or polyimide instead.

An oriented film of an inorganic compound is formed on the other electrode 9, and the liquid crystal orientation control film 8 is provided without rubbing.

Between the liquid crystal oriention control films 6 and 8, a ferroelectric liquid crystal, for example, biphenyly-related chiral smectic liquid crystals is disposed.

Figure 4:
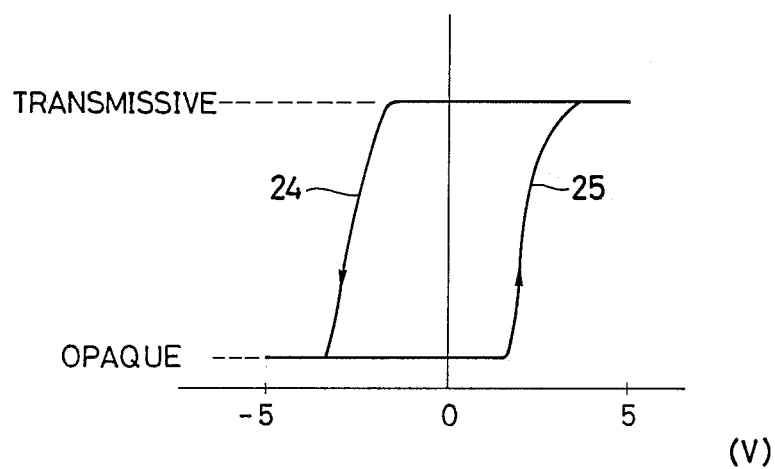
FIG. 4 is a graph showing the characteristics of transmitted light of the storage region of the card of the present invention.

Other than these, BOBAMBC FLC and the like or a blend of a plurality of liquid crystals FLC can be filled. An example of the threshold valve characteristics of FLC is given in FIG. 4. Also, FIG. 4 shows a pair of curves 24 and 25 obtained by the application of ±5 V. Specifically, the light is transmitted or not transmitted by causing the liquid crystal molecule to reverse, and at the same time, hysteresis showing the memory effect is obtained.

In FIG. 4, the vertical axis is the transmission ratio of the light.

The display region 2 of the card 1 has substantially the same structure as the previously described storage region 3 except that in this embodiment of the present invention, the pair of electrodes 5 and 9 have a matrix structure, so that characters, diagrams, and symbols can be displayed by means of dots. In addition, the required IC is provided on the card.

Specifically, the storage region 3 and the display region 2 of the card differ only in the shape of the electrodes, with the other structural parts being exactly the same. Therefore, a card which has both of the display function and storage capability can be formed by a conventional process for preparing liquid crystal display devices.

In addition, a pair of light polarizer 16 and 20 is applied, completely covering both sides of the card, so that a light polarizing means in the optical read-out means becomes completely unnecessary.

Also, the light polarizer on the card do double duty as polarizing plates in the display and storage regions.

In addition, the liquid crystal molecule 12 has the capability of self-alignment along the protruding section 23. In this way, the liquid crystal molecules of the data storage section 26 are provided with an improved orientation status with no defects, and the data can be accurately stored in memory.

The protruding section 23 can also serve as a spacer for the liquid crystal cell. This allows a reduction in the steps and costs of the production process.

The above is one example of the use of this display memory card. In the case where it is used as a CD (Cash Dispenser) card by a bank or the like, the cardholder goes to the bank, then the electrodes 5' and 9' of the card are inserted into the CD terrminal equipment connected to a computer, so that power is fed to the card, and data such as the cardholder's name, the account number, details of past transactions, and the like is extracted from the card memory by the optical system read-out means. At the same time, new data is written in by optical means, and the required data is displayed on the card.

The liquid crystals used in this display arre liquid crystals which show ferroelectricity (chiral smectic C liquid crystals), which when sealingly enclosed in a parallel plane space narrower than the spiral pitch of the liquid crystals, is positioned in a stable two-axis direction. One of these two directions can be selected by means of an electric field. Also, even if this electric field is removed, the liquid crystals remain secured in a stable position. By combining with a polarizing plate, the display (of characters and the like) can be maintained.

Accordingly, when the card is removed from the CD terminal, the power supply to the card is cut off, but the data remains in the memory region basesd on the liquid crystals with strong dielectric properties and in the display region with strong dielectric properties.

In this way, the user at any time, anywhere, can see the contents of the memory.

This example describes the method of using the card of the present invention as a bank CD card only, but it is also possible to apply the card to other uses.

In this embodiment, the card of the present invention is shown to comprise the display region 2 and the storage region 3 of a transmission type, but, in other embodiments, use of a reflection type does not diminish the effect of the present invention. In such a case, a laser beam is reflected in the electrode section of the card which is one part of the pair of electrodes for memory, so that it is possible to make one of the substrates from metal, whereby the card of the present invention can be made at a lower price.

In addition, in the case where an external terminal is not provided in the card of the present invention, it is possible to read the memory of the card without using an electrical connection, and in this case the storage section works as a ROM.

Also, it is possible to add two-color dye within the FLC to store and display data in guest-host mode. In this case, there is the feature that the polarized light means may be one or zero.

By incorporating in the interior of the card form a display device and a storage region, which use ferroelectric liquid crystals, as opposed to what has been available up to the present in cards with magnetic card systems, a memory function is provided in the card itself, and one part or all of the memory of this card can be checked at any time through a display device, for which a special terminal device is therefore unnecessary.

In addition, because power is necessary only for rewriting, it is not necessary to have a source of power in the card itself. If a power source is provided on the card, a solar cell may be used.

Also, because it is possible to provide a card with the storage region and the display region having substantially the same structure, when the card is prepared, a card with two functions can be created at a low cost using the same process as for conventional liquid crystal display devices, and a memory card which can easily be mass-produced is obtained.

The storage region of the present invention has substantially the same structure as the display region. However, no data in the storage region is externally displayed, and is known unless it is read out with dedicated equipment. Therefore the card can be used as an ID card. Also, a source of power such as batteries and the like is unnecessary, and control equipment such as a CPU and the like is not required. Therefore, the mechanism is simple and it is possible to produce a large volume at low cost. Also, the reliability of the stored data is improved by providing the data storage means and the display means. In addition, rewriting is impossible unless a voltage or heat is applied to the liquid crystal, so the data cannot be erased by normal, everyday temperature changes and is therefore very stable, keeping the advantages that it is possible to reuse the card by revising or changing the stored data.

In addition, because a light polarizing means applied to the card can be commonly used for the display region and the storage region, lower cost production is possible.

What is claimed is:

1. A non-volatile ferroelectric crystal card memory comprising:
   a pair of card substrates, at least one of said substrates being transparent;
   a first ferroelectric liquid crystal layer disposed between said substrates;
   an electrode arrangement provided on the inside surfaces of said pair of substrates for applying an electric field to change the anisotropic direction of said liquid crystal layer, wherein said electrode arrangement is a pair of electrodes extending opposite to each other with said liquid crystal layer inbetween;
   a pair of orientation control films provided on the opposed insides of said substrates;
   a display section which is composed of a second ferroelectric liquid crystal layer between said pair of card substrates whose optical property is controlled by applying an electric field thereto; and
   a second electrode arrangement provided on the inside surfaces of said pair of substrates for applying a particular portion of said second liquid crystal layer to display visual information.

2. A card memory comprising;
   a pair of substrates, at least one of said substrates being transparent;
   a first ferroelectric liquid crystal material disposed between said substrates;
   first and second electrode arrangements formed on the inside surfaces of said substrates in order to form a memory section in which information can be stored in terms of the bistability of said liquid crystal material and a display section in which visual information can be displayed in terms of the bistability of said liquid crystal material; and
   a pair of orientation control films provided on the opposed insides of said substrates.

3. The card memory of claim 2, wherein said visual information is letters, characters, symbols, or other images.

4. The memory of claim 3, wherein said second electrode arrangement is formed into a matrix structure.

5. The memory of claim 3, wherein said liquid crystal material in said memory and display sections are made of a same ferroelectric liquid crystal material.

6. The memory of claim 5, further comprising an IC chip for driving said memory section and said display section.

7. The memory of claim 6, further comprising an external terminal for receiving a control signal from an external device.

8. The memory of claim 6, further comprising an external terminal for receiving electric power required for operation of said memory.

9. The memory of claim 6, further comprising a solar cell for supplying electricity to said memory.

10. The memory of claim 2, wherein each of said substrates is 8.6 cm wide and 5.4 cm long.

11. A card memory comprising:
    a pair of substrates wherein at least a portion of one of said substrates is transparent;
    a ferroelectric liquid crystal layer interposed between said substrates, said ferroelectric liquid crystal layer comprising a first portion and a second portion, said first portion being located to receive light rays through the transparent portion of at least one of said substrates;
    a first electrode arrangement formed on the inside surfaces of said pair of substrates and located on both sides of the first portion of said liquid crystal layer in order to constitute a liquid crystal display by said first electrode arrangement and said first portion of said ferroelectric liquid crystal layer; and
    a second electrode arrangement formed on the inside surfaces of said pair of substrates and located on both sides of said second portion of said liquid crystal layer in order to constitute a non-volatile liquid crystal memory by said second electrode arrangement and said second portion of said ferroelectric liquid crystal layer, wherein information is stored in terms of the bistability of said liquid crystal layer.

12. The memory of claim 11, wherein said information is letters, characters, symbols, or other images.

13. The memory of claim 12, wherein said second electrode arrangement is formed into a matrix structure.

14. The memory of claim 12, wherein said first and second liquid crystal layers are made of a same ferroelectric liquid crystal material.

15. The memory of claim 14 further comprising an IC chip for driving said memory and said display.

16. The memory of claim 15 further comprising an external terminal for receiving control signal from an external device.

17. The memory of claim 15 further comprising an external terminal for receiving electric power required for operation of said memory.

18. The memory of claim 15 further comprising a solar cell for supplying an electricity to said memory.

19. The memory of claim 11 further comprising a pair of orientation control films provided on the opposed insides of said substrates, one film being made of polyimide and the other being made of SiO2.

20. The memory of claim 11, wherein said memory substrate is 8.6 cm wide and 5.4 cm long.

* * * * *